United States Patent [19]

Torrence

[11] Patent Number: 5,577,705
[45] Date of Patent: Nov. 26, 1996

[54] COIL CONNECTION FOR SOLENOID OPERATED VALVE

[75] Inventor: Robert J. Torrence, Sanford, N.C.

[73] Assignee: Eaton Corporation, Cleveland, Ohio

[21] Appl. No.: 218,783

[22] Filed: Mar. 28, 1994

[51] Int. Cl.$^6$ .................................................. F16K 31/06
[52] U.S. Cl. .................. 251/129.15; 251/129.01
[58] Field of Search .................. 251/129.01, 129.15, 251/129.08, 129.05

[56] References Cited

U.S. PATENT DOCUMENTS

| | | | |
|---|---|---|---|
| 3,580,267 | 5/1971 | Baker | 251/144 X |
| 4,314,585 | 2/1982 | Nishimiya et al. | 251/129.08 X |
| 4,892,285 | 1/1990 | Torrence | 251/129.15 X |
| 4,978,058 | 12/1990 | Duncan et al. | 251/129.08 X |
| 5,080,288 | 1/1992 | Shen | 251/129.15 X |
| 5,197,508 | 3/1993 | Göttling et al. | 251/129.08 X |

*Primary Examiner*—Kevin Lee
*Attorney, Agent, or Firm*—Roger A. Johnston

[57] ABSTRACT

A solenoid operated valve suitable for use as a refrigerant expansion valve. An electrical receptacle is attached to the side of the valve body and has thermistor probes attached for sensing temperature in port provided in the body. The receptacle has terminals in a recess on one end enabling the solenoid to be attached to the valve and plug-in to the receptacle. The solenoid terminals and the probes are converted internally in the receptacle to recessed connector pins in the opposite end of the receptacle to enable a single, multi-in external harness connector to connect the solenoid and probes by plug-in to the receptacle.

9 Claims, 1 Drawing Sheet

COIL CONNECTION FOR SOLENOID OPERATED VALVE

BACKGROUND OF THE INVENTION

The present invention relates to electrically operated valves and particularly to valves operated by a solenoid for proportional control of flow through the valve in response to an electrical signal. It has been desired to provide such a valve for controlling refrigerant flow in vehicle passenger compartment air conditioning systems such that electronic control of the refrigerant flow to the evaporator may be provided to permit faster response to changing thermal load conditions and improved temperature control of the passenger compartment.

Heretofore, it has been common practice in automotive passenger compartment air conditioning systems to employ a mechanical expansion valve for controlling refrigerant flow to the evaporator which is operated by a temperature sensitive capsule filled with fluid where expansion and contraction of the fluid with temperature changes causes movement of the valve member for controlling flow to the evaporator. Mechanical thermal expansion valves of the aforesaid type have proven to be low in manufacturing cost and reliable for extended periods of service as encountered in automotive applications. However, the mechanical thermal expansion valve has the disadvantage that it can only react to changes in temperature of the fluid in the capsule which is typically thermally connected to the refrigerant discharging from the evaporator. Thus, The thermal expansion valve cannot anticipate changes in thermal load on the system and control refrigerant flow to accommodate the rapid changes. Thus, it has been desired to provide an electrically operated expansion valve for use in automotive air conditioning systems.

However, in designing an electrically operated valve for use as a refrigerant expansion valve and in particular for automotive air conditioning applications, it has been found difficult to provide such a valve which is low in manufacturing cost and rugged and reliable enough for automotive service applications. In such applications, it has been found desirable to utilize a solenoid as the electrical operator for the refrigerant valve inasmuch as a solenoid can provide armature movement proportional to variations in a control signal applied to the solenoid coil and thus can provide a proportional control electrically operated refrigerant expansion valve.

In providing an electrically operated proportional filter control valve employed as a refrigerant expansion valve, it has been found necessary to utilize thermistor temperature sensing elements in sensing ports formed in the valve block in order to provide the necessary temperature inputs to the electrical control system generating the control signal for the valve solenoid. Typically, the thermistor sensing probes are inserted in sensing ports provided in the side of the valve block; and, the solenoid coil is mounted on the end of the valve block for actuating the valve controlling armature. Thus, separate electrical connections are required for the coil and for the thermistors in order to connect the valve in circuit with an electronic controller.

Thus it has been desired to provide an electrically operated valve suitable for controlling refrigerant expansion and particularly in automotive air conditioning applications which provides thermistor temperature probes in valve sensing ports and also provides for electrical connection to a solenoid for electrical proportional control of the valve operator. It has been particularly desired to provide such a valve which is low in manufacturing cost and easily assembled in high volume mass production particularly in the quantities required for automotive vehicle production applications.

SUMMARY OF THE INVENTION

The present invention provides a solenoid operated valve having sensing ports provided in the valve body or block with thermistors disposed therein and having an encapsulated coil mounted on the body remote from the thermistors. An electrical receptacle is mounted on the valve body and has the thermistors connected therethrough to electrical terminals adapted for external connection thereto. The solenoid coil has electrical terminals provided on the encapsulation or cover; and, the terminals plug into the electrical receptacle on the valve body as the solenoid operator is attached to the valve body. The electrical receptacle mounted to the valve body has electrical terminals disposed for common connection externally both to the thermistors and to the coil such that a single harness connector attached to the receptacle can connect to the coil and the thermistor leads.

DETAILED DESCRIPTION

Figure 1:
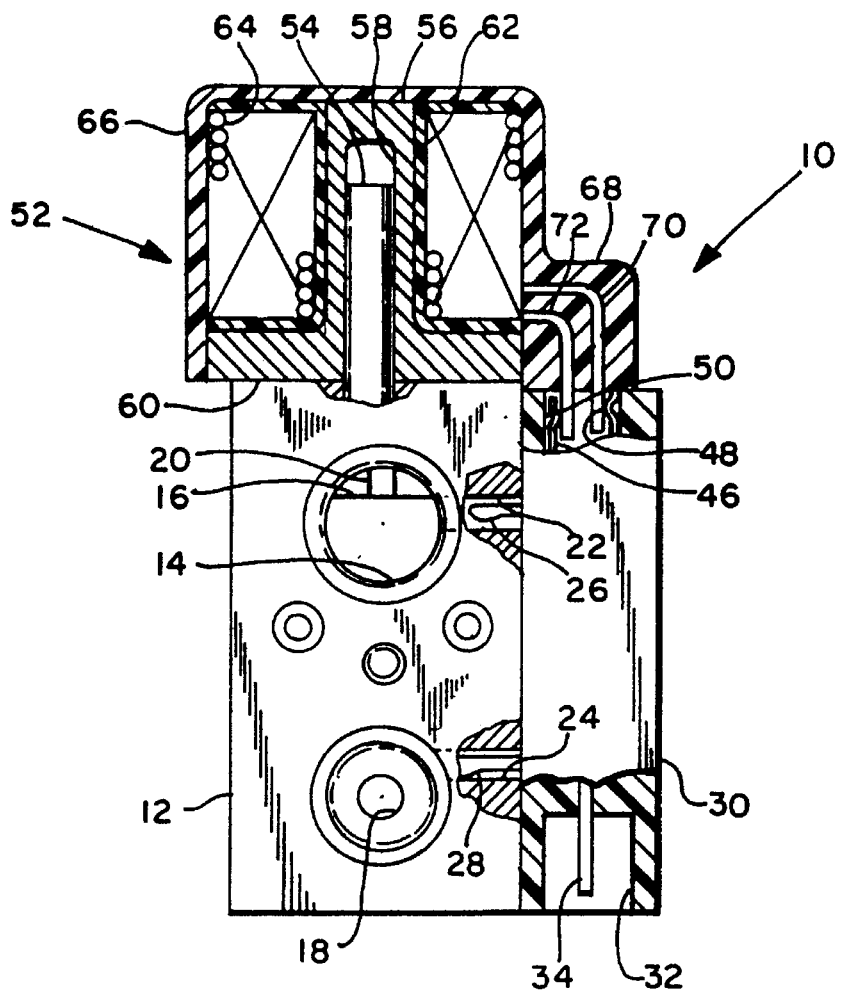
FIG. 1 is a side elevation view of the valve assembly of the present invention with portions of the receptacle body and coil broken away to show the electrical connections; and, FIG. 2 is an electrical schematic of the valve coil, thermistors and electrical receptacle.

Referring to FIG. 1, the valve assembly indicated generally at 10 has a body or block 12 with a valve inlet port 14 formed in one side thereof which communicates with a valving chamber 16 which communicates with a valve outlet (not shown). An optional through passage 18 may be provided in the valve block which provides a convenient location for sensing temperature but which has no function insofar as the valving operation. A valving operator 20 is provided which is operable upon movement to effect flow controlling movement with respect to a valve seat (not shown).

A sensing port 22 is provided in the valve block and which communicates with inlet 14. If desired an optional second temperature sensing port 24 is provided in the same side of the valve block 12 as port 22. The sensing port 24 communicates with the through passage 18. Passage 22 has a temperature sensing probe such as a thermistor 26 received therein; and, the sensing port 24 similarly has a sensing probe 28 received therein. The probes 26,28 are each connected through an electrical receptacle 30 which is attached to the side of the valve block by any convenient expedient, as for example, threaded fasteners (not shown).

The receptacle 30 has a recess 32 formed in one end thereof, which recess has a plurality of electrical terminal pins extending in a row therein, one of which is shown in FIG. 1 and denoted by reference numeral 34.

The terminal pin 34 is connected to one lead of the temperature sensing probe 28 and others of the pins in recess 32 are connected to the remaining leads of thermistors 28,26.

Figure 2:
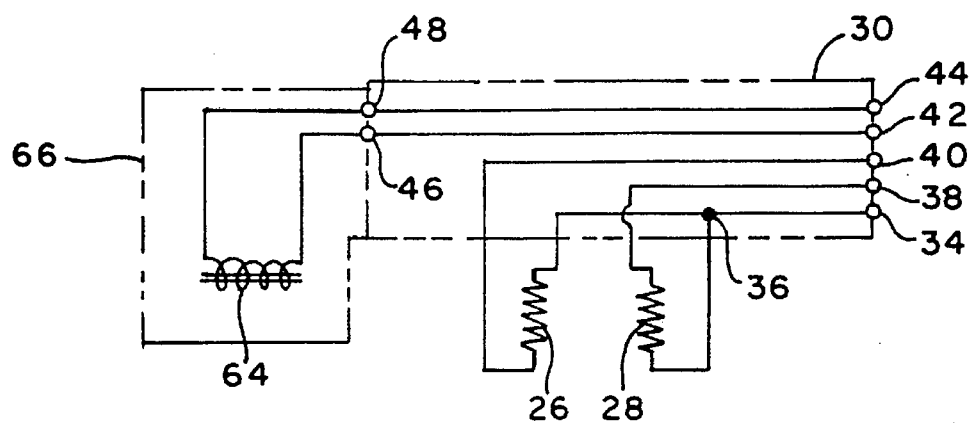

Referring to FIG. 2, one lead of each of the thermistors 26,28 s connected to junction 36. The remaining lead of thermistor 28 is connected to terminal pin 38 in receptacle 30; and, the remaining lead of thermistor 26 is connected to a third pin 40 of receptacle 30.

The remaining two pins 42,44 in recess 32 of receptacle 30 are connected by leads internal to the receptacle 30 to respectively individual terminals 46,48 provided in a recess 50 formed in the end of receptacle 30 opposite the recess 32.

Referring to FIG. 1, an electrical operator subassembly indicated generally at 52 comprises a ferromagnetic armature 54 and nonmagnetic armature guide 56. The armature 54 is slidably received in a recess 58 formed in the guide which has an outwardly extending flange portion 60 which is attached to the end of the valve body 12 by any suitable mechanical expedient, as for example, threaded fastening. Subassembly 52 includes a plastic coil bobbin 62 received over the armature guide 56 with a plurality of turns of electrical conductor in the form of wire 64 wound about the bobbin to form a coil. The coil is preferably encapsulated with plastic material 60 which forms a cover 66 thereover; and, cover 66 also has integrally formed therewith a terminal supporting block or holder portion 68 which extends from one side of the cover 66 and is registered against the end of receptacle 30.

The holder 68 has inserted therein a pair of electrical connector terminals 70,72 each of which is connected to one end lead of the coil winding 64. Terminals 70,72 are respectively individually in frictional contact with terminals 46,48 upon attachment of the subassembly 52 to the valve body 12. It will be understood that armature 54 is operative upon coil energization to effect movement of valve operator 20 for controlling flow through the valve.

The present invention thus permits ease of assembly of an electrical valve operator onto the valve body in such a manner as to make bayonet type electrical connection with a receptacle 30 mounted on the side of the valve body. The receptacle is also connected to sensing probes in the valve body. The solenoid operator 52 and sensing probes 26,28 are connected to electrical terminals extending in a common recess on the end of the receptacle 30 which enables common electrical connection to an external connector through the recess 32. The present invention thus provides a simple reliable and costeffective way of assembling an electrically operated valve, which is particularly suitable for refrigerant expansion valve application and provides for electrical connection to the valve operator and temperature probes mounted on the valve.

Although the invention has been described hereinabove with respect to the illustrated embodiments, it will be understood that the invention is capable of modification and variation and is limited only the following claims.

We claim:

1. An electrically operated valve assembly comprising:
   (a) body means defining an inlet port, an outlet port and a valving chamber with a member moveable therein for controlling flow between said inlet and outlet;
   (b) armature guide means attached to said body means and having therein an armature operable upon movement for effecting said movement of said valve means;
   (c) said body means including electrical receptacle means having means for electrical plug-in connection disposed adjacent said armature guide means;
   (d) coil means received over said armature guide means, said coil means including terminal means electrically engaging said plug-in connection means as said coil means is received over said armature guide means;
   (e) said receptacle means including other terminal means connected to said receptacle means and adapted for external electrical connection thereto.

2. The valve assembly defined in claim 1, wherein said armature guide means and said receptacle means extend from said body means in a common direction.

3. The valve assembly defined in claim 1, further comprising sensor means in at least one of said inlet and outlet, said sensor means connected to said receptacle means.

4. The valve assembly defined in claim 1, wherein said coil means and said armature guide means comprise a sub-assembly attached as a unit to said body means.

5. The valve assembly defined in claim 1, wherein said body means includes at least one sensing port; and, said receptacle means includes a sensor engaging said port in plug-in arrangement.

6. The valve assembly defined in claim 1, wherein said body means includes at least one sensing port; and, said receptacle means includes a sensor plugged into said port at right angles to said terminal plug in connection.

7. A method of making an electrically operated valve assembly comprising:
   (a) providing a valve block or body and forming a valve seat access opening therein and forming a sensing port therein at right angles to said access opening;
   (b) providing a receptacle housing having a sensing probe extending therefrom and an electrical plug-in connection thereon and inserting said probe in said sensing port; and,
   (c) providing a coil assembly having an armature and electrical terminals and inserting said armature in said access opening and inserting said terminals in said electrical plug-in connection as said armature is inserted in said opening and securing said coil assembly to said body.

8. The method defined in claim 7, wherein said step of inserting said armature and inserting said terminals is performed simultaneously.

9. The method defined in claim 7, wherein said step of inserting said probe in said sensing port includes the step of attaching said housing to said body.

* * * * *